United States Patent

Kuznetsov et al.

[11] 4,121,419
[45] Oct. 24, 1978

[54] START FLAME IGNITER OF THE COMBUSTION CHAMBER OF A GAS-TURBINE ENGINE

[76] Inventors: Vladimir Grigorievich Kuznetsov, ulitsa Timiryazeva, 33, kv. 4; Alexandr Grigorievich Tomilin, ulitsa Kalinina, 28, kv. 22; Igor Anatolievich Shleenkov, ulitsa Timiryazeva, 32, kv. 70, all of Stupino Moskovskoi oblasti, U.S.S.R.

[21] Appl. No.: 762,956

[22] Filed: Jan. 26, 1977

[51] Int. Cl.² .............................................. F02C 7/26
[52] U.S. Cl. ........................... 60/39.82 P; 60/39.82 S; 431/263; 431/264
[58] Field of Search .................... 60/39.82 P, 39.82 S, 60/39.82 R, 39.82 N; 431/263, 264, 265, 266

[56] References Cited

U.S. PATENT DOCUMENTS

| | | | |
|---|---|---|---|
| 1,887,730 | 11/1932 | Macrae et al. | 431/263 |
| 2,941,363 | 6/1960 | Cuny et al. | 60/39.82 S |

FOREIGN PATENT DOCUMENTS

| | | | |
|---|---|---|---|
| 1,096,684 | 1/1961 | Fed. Rep. of Germany | 60/39.82 P |
| 806,357 | 12/1958 | United Kingdom | 60/39.82 N |
| 1,022,394 | 3/1966 | United Kingdom | 431/263 |

*Primary Examiner*—Robert E. Garrett
*Attorney, Agent, or Firm*—Haseltine, Lake & Waters

[57] ABSTRACT

A start flame igniter of the combustion chamber of a gas-turbine engine has a housing with an injector for spraying fuel supplied to a combustion chamber of the igniter. Located inside the igniter housing are a spark plug in such a way that a discharge zone of the spark plug contacts the fuel sprayed by the injector and a cylindrical bushing which is coaxial to the spark plug and partially embraces said spark plug at the side where the spark plug discharge zone is situated. The length of the bushing is sufficient to ensure a direct contact with the fuel sprayed by injector at a minimum cone of the fuel spray relative to the operation duty of the injector. The bushing butt facing the sprayed fuel has an inclination which coincides approximately with a generatrix of the minimum cone of the fuel spray. The bushing butt is provided with a plate following the shape of a half of butt nearest to the injector. The plate along the axis has a recess embracing the discharge zone of the spark plug. In addition the housing has a duct for supplying air to the combustion chamber of the igniter and a branch for connecting the combustion chamber of the igniter with the combustion chamber of the engine.

2 Claims, 2 Drawing Figures

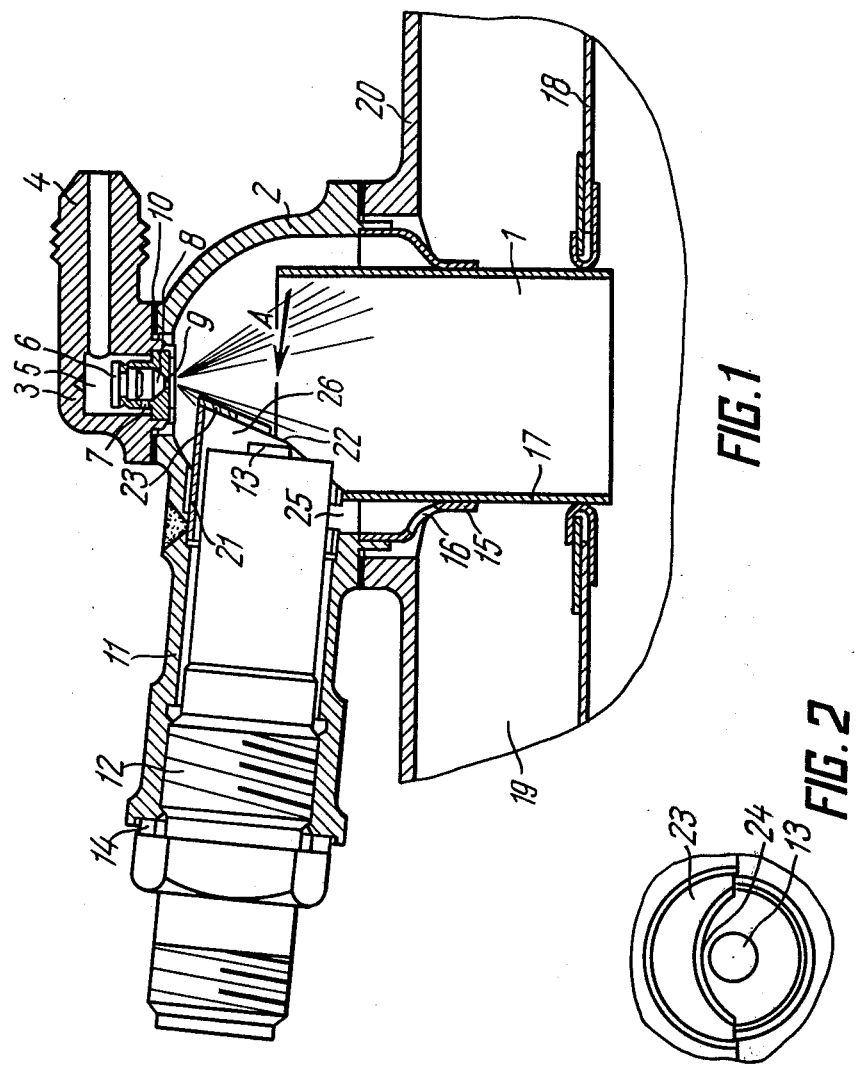

START FLAME IGNITER OF THE COMBUSTION CHAMBER OF A GAS-TURBINE ENGINE

The present invention relates to gas-turbine engines and more particularly to start flame igniters of the combustion chamber of a gas-turbine engine.

At present the object to ensure a reliable and efficient ignition of the fuel-air mixture in the combustion chambers of the gas-turbine engines such as aircraft engines, in the wide range of environment changes at the moment of the ignition start is very important.

To ignite the fuel-air mixture formed in the combustion chamber of the gas-turbine engine when the fuel is sprayed thereto via an injector some amount of heat sufficient for the ignition shoud be imparted to the fuel-air mixture. As a source of such a heat use is made of either a spark discharge on an electrical spark plug or torch of a start flame igniter.

A comparison of the ignition start of the combustion chamber of the gas-turbine engine by using directly a spark discharge on the spark plug and a flame igniter permits to disclose advantages as well as disadvantages of one ignition start over the other. The ignition start of the combustion chamber of the gas-turbine by using directly the spark discharge on the spark plug has more simple structural embodiment and lower weight in comparision with the ignition start thereof by using the flame igniter. However the spark ignition can provide for a normal ignition start only in the combustion chambers having conditions suitable for burning the fuel at low values of air pressure and air temperature at the inlet of the combustion chamber when flying at high altitude since this slows the chemical reaction of fuel oxidation and worsens the fuel-air mixture formation process, thus reducing a range of the ignition of the fuel-air mixture relative to its composition and decreasing the fullness of the fuel combustion especially at the duties of the engine start. As a result, the ignition of the fuel-air mixture and the ignition start of the combustion chamber when flying at high altitude, by using a comparatively low power spark discharge on the spark plug is troublesome, thus reducing the operational reliability of the engine as a whole unit.

An increase in the power of the spark discharge on the spark plug for enhancing the reliability of the ignition start has some known ranges since it is impossible to increase the weight of the whole system and to reduce the duration of its operation.

One of the methods for enlarging the range of the ignition and enhancing the efficiency of the fuel-air mixture combustion when flying at high altitude and increasing the reliability of the ignition start of the combustion chamber of the gas-turbine engine by using the spark ignition consists of increasing the time of the fuel combustion and its stay in the combustion chamber. For the purpose the sizes of the combustion chamber and its operating volume should be increased to the range suitable for the ignition start when flying at high altitude. This leads to an increase of overall sizes and weight of the combustion chamber and the engine as a whole.

In addition the spark ignition start of the combustion chamber of the gas-turbine engine does not possess the general purpose nature since the solution of the problem concerning the ignition start requires an individual approach to each type of the engine separately in view of considerable differences in the structure of the gas-dynamic flow in the cavity of the combustion chamber in the different types of the engines which is a decisive factor in the reliable and efficient ignition start.

Another method for enlarging the range of the ignition and enhancing the efficiency of the fuel-air mixture combustion when flying at high altitude and therefore increasing the reliability of the ignition start of the combustion chamber of the gas-turbine engine consists of applying start flame igniters.

The start flame igniter is a miniaturized combustion chamber wherein a spark plug is used for firing the fuel-air mixture. The fuel-air mixture is ignited and the torch having a plurality of active burning centers rushes into the combustion chamber of the engine to ignite the fresh fuel-air mixture. Due to the relatively great thermal power and correct thend of the torch these flame igniters ensure a reliable ignition start of the combustion chamber in the different environment. After the ignition start the flame igniter is cut off.

The reliability of the operation of the start flame igniter depends on the same factors as the operation of the combustion chamber of the gas-turbine engine by using the spark ignition start such as outline of its inner portion, air flow, arrangement of the fuel injector and spark plug as well as their characteristics and performances.

However in difference from the main combustion chamber of the gas-turbine engine the combustion chamber of the igniter due its relative independence has a possibility for a greater variation of said factors in the directions suitable for the reliable ignition start.

In addition these devices make it possible to improve the conditions for igniting and intensifying the combustion process in the combustion chamber of the igniter by introducing a heating of air and fuel prior to the supply into the combustion chamber, an oxygen feed of the combustion zone or a forced pulsation of the fuel pressure to elevate the selective capacity of the igniter relative to the composition of the fuel-air mixture.

The use of similar means for intensifying the combustion process on the main combustion chambers of the engines causes unpermissible increase of the weight and complication of the embodiment of the combustion chamber and the engine as a whole due to the greater air flow and fuel flow through the main combustion chamber in comparison with the air and fuel flows through the igniter.

An incomparable advantage of the flame ignition start of the combustion chamber of the gas-turbine engine over the spark ignition start thereof consists of a possibility to apply the same igniter on the engines of different types, i.e., the flame igniter acquires the general purpose nature of the application.

However the introduction of the means for intensifying the combustion process even on the flame igniters only complicates nevertheless the structure as a whole and reduces the reliability of its operation due to the use of additional functional members but less than in the main combustion chambers. Therefore, warranted are the designs of the flame igniters operating in a simple diagram without intensifying the combustion process therein by using additional means but having the same or lower performances in the ignition start as those with said additional means.

An example for this approach for solving the problem of the ignition start of the combustion chamber of the gas-turbine engine by using a flame igniter may be a known flame igniter.

An example for this approach for solving the problem of the ignition start of the combustion chamber of the gas-turbine engine by using a flame igniter can be a start flame igniter.

The start flame igniter of the combustion chamber of the gas-turbine engine is a miniaturized cylindrical combustion chamber having in the butt wall a central opening for passing the air to the combustion chamber. Located inside the combustion chamber in close vicinity to the butt wall along the axis of the opening and the whole igniter is a spraying injector and behind said injector along the flow a round plate deflector with a plurality of small holes is arranged. The deflector is confined in a cylindrical bushing whose one end is secured to the butt wall and coaxial to the igniter in such a way that a gap is formed between the bushing and the deflector. In the cavity of the cylindrical combustion chamber of the igniter behind the deflector a spark plug is installed. Arranged at the outlet of the combustion chamber of the igniter is a cylindrical branch whose diameter is somewhat less than that of the combustion chamber of the igniter, said branch coupled to the cylindrical wall of the combustion chamber with the aid of a flat butt wall. This branch is used to connect the combustion chamber of the igniter with the main combustion chamber of the engine.

Air is supplied to the igniter via the central opening in the butt wall and being mixed with the fuel sprayed by the injector streams to the deflector, passes via the holes in the deflector as well as via the gap between the deflector and the cylindrical bushing and flows into the combustion chamber where the fuel-air mixture is ignited by an electrical discharge of the spark plug and a torch rushes along the branch into the combustion chamber of the engine.

However this embodiment of the start flame igniter has the disadvantage consisting of the fact that the deflector protecting the spark plug from an overflow of fuel impedes the passage of the fuel sprayed by the injector to the spark plug, thus destroying the fuel spray cone. This worsens the fuel-air mixture formation and slows the rate of the chemical reaction of the fuel oxidation, thus reducing the range of ignition of the fuel-air mixture in its composition and reducing the fullness of the fuel combustion and therefore the thermal power of the flame of the igniter. As a result, the reliability and efficiency of the ignition start of the combustion chamber and reliability of operation of the engine as a whole are reduced.

It is an object of the present invention to raise the operational reliability of the gas-turbine engine by providing for a reliable and efficient ignition of the fuel-air mixture in the combustion chamber of the gas-turbine engine in a wide range of the environment variation at the moment of its ignition start.

According to the abovementioned and other objects the essence of the present invention is that the start flame igniter of the combustion chamber of the gas-turbine engine, whose housing mounts an injector for spraying fuel supplied to the combustion chamber of the igniter wherein a spark plug is located in such a way that a discharge zone of the spark plug contacts the fuel sprayed by the injector, in addition said housing has a duct for supplying air to the combustion chamber of the igniter to the combustion chamber of the engine, according to the invention, is provided with a cylindrical bushing coaxial to the spark plug which embraces partially said spark plug at the side where the discharge zone of the spark plug is situated and has the length sufficient for a direct contact with the fuel sprayed by the injector at a minimum cone of the fuel spray relative to the operation duty of the injector whereas the butt of the bushing facing the sprayed fuel has an inclination approximately coinciding with the generatrix of the minimum cone of the fuel spray and the bushing butt is provided with a plate following the shape of a half of butt nearest to the injector said plate having along its axis a recess to embrace the discharge zone of the spark plug.

The cylindrical bushing according to the invention has a port for supplying air to a cavity of the bushing, said port located at the side where air is supplied into the combustion chamber of the igniter.

The cylindrical bushing being coaxial to the spark plug and partially embracing said spark plug at the side where the discharge zone of the spark plug is situated prevents the spark plug from the overflow of fuel supplied downwards to the spark plug. When this bushing is absent, the fuel deposits on the body of the spark plug and flows along it to the discharge zone whereas concentrated in the discharge zone of the spark plug is an overrich fuel-air mixture which cannot be ignited.

The embodiment of the bushing with the length sufficient for a direct contact with the fuel sprayed by the injector at a minimum cone of the fuel spray and the embodiment of the bushing butt facing the spraying fuel with an inclination approximately coinciding with a generatrix of the minimum cone of the fuel spray in such a way that the plane of the inclination at its imaginary continuation crosses the axis of the cone of the fuel spray at a distance of not more than 10 diameters of the injector nozzle from its face section in the counterflow direction, at all the oscillations of the angle of the fuel spray cone due to the fuel temperature and flight altitude ensure the passage of an approximately constant amount of the fuel sprayed by the injector, to the discharge zone of the spark plug, quick and reliable ignition thereof.

The use of the plate on the bushing butt, following the shape of a half of butt nearest to the injector protects the discharge zone of the spark plug from an overflow of fuel supplied into the discharge zone from the bushing butt.

The recess in the plate to embrace the discharge zone of the spark plug provides for a direct contact of the electric discharge on the spark plug with the fuel-air mixture in the combustion chamber of the igniter, being formed when the fuel is sprayed through the spraying injector.

The port in the cylindrical bushing for supplying air to the bushing cavity, located at the side where air is supplied into the combustion chamber of the igniter provides for a constant flow of air through the bushing cavity, thus ensuring the cooling of the spark plug and absence of the stagnant fuel-air zones in this cavity which cause carbon deposit formation on the spark plug and the bushing and as a result make the spark plug inoperative.

In addition this air flow provides for a constant supply of air jets into the discharge zone of the spark plug and together with the fuel sprayed and delivered to this zone, contributes to the formation of the fuel-air mixture suitable in its composition for the ignition.

The use of the bushing also contributes to a selective capacity of the igniter in the composition of the mixture since the electric discharge of the spark plug in a small volume of the bushing cavity causes the pressure pulsation therein and therefore the same pulsative variation of the fuel-air mixture composition in the discharge zone of the spark plug, thus improving the conditions of the ignition start.

All the said structural features of the embodiment of the start flame igniter operating according to the more simple diagram contribute to the reliable and efficient ignition start of the combustion chamber of the gas-turbine engine at low environment temperatures and low temperatures when flying at high altitude.

Other objects and advantages of the present invention will appear more completely from the following detailed description of a preferred embodiment thereof taken as an example with due reference to the accompanying drawings wherein:

FIG. 1 shows schematically a longitudinal section of the start flame igniter of the combustion chamber of the gas-turbine engine according to the invention.

FIG. 2 shows a view along arrow A.

According to the invention, the start flame igniter to the combustion chamber of the gas-turbine engine is a miniaturized combustion chamber 1 (FIG. 1) whose hemispherical housing 2 mounts an injector 3 having a sleeve 4 for supplying fuel into a cavity 5 of the injector 3 and a centifugal sprayer 6 located in the cavity 5 and having two tangential passages 7 for supplying fuel into vortex chamber 8 and a nozzle 9 for communicating the vortex chamber 8 with the combustion chamber 1 of the igniter. The injector 3 is secured to the housing 2 by using two screws (not shown). Installed in the plane of the contact of the injector 3 and the housing 2 is a sealing gasket 10 to prevent air and fuel from leaking from the combustion chamber 1 to the ambient medium. Threaded into a boss 11 of the housing 2 is an electrical spark plug 12. A discharge zone 13 of the spark plug 12 contacts the fuel sprayed by the injector 3 in the combustion chamber 1 and installed in the contact thereof with the boss 11 is a copper sealing washer 14. A reducer 15 having holes 16 for passing air to the combustion chamber 1 is used to connect the housing 2 with a branch 17 communicating the combustion chamber 1 of the igniter with the cavity of the main combustion chamber 18 of the engine and separating the combustion chamber 1 from the cavity of an annular passage 19 between a housing 20 and the main combustion chamber 18 of the engine.

The flame igniter is provided with a cylindrical bushing 21 being coaxial to the spark plug 12 and partially embracing said spark plug at the side where the discharge zone 13 of the spark plug 12 is situated. The bushing 21 has the length sufficient for a direct contact with the fuel sprayed by the injector 3 at a minimum cone of the fuel spray relative to the fuel pressure not less than 295 kPa in the cavity 5 of the injector 3. The butt 22 of the bushing 21 facing the sprayed fuel has an inclination which approximately coincides with a generatrix of the minimum cone of the fuel spray in such a way that the plane of the inclination at its imaginary continuation crosses the axis of the fuel spray cone at a distance of not more than 10 diameters of the nozzle 9 of the injector 3 from the face section in the counterflow direction. The butt 22 is provided with a plate 23 (FIG. 2) following the shape of a half of butt 22 nearest to the injector 3 (FIG. 1) whereas along the axis of the bushing 21 the plate 23 (FIG. 2) has a recess 24 embracing the discharge zone 13 of the spark plug 12 (FIG. 1). The bushing 21 also has a port 25 for supplying air into a cavity 26 of the bushing 21, located at the side where air is supplied into the combustion chamber 1 of the igniter through the holes 16 in the reducer 15.

The start flame igniter is installed on a housing 20 of the main combustion chamber 18 and operates as follows:

At the moment of the ignition start the fuel is supplied through the sleeve 4 into the injector 3. The fuel flows along the tangential passages 7 whose axis is set off relative to the axis of the nozzle 9, to the vortex chamber 8. In the vortex chamber 8 the fuel acquires an intensive rotary motion and is supplied into the nozzle 9. At the outlet of the nozzle 9 the liquid particles of the fuel which have slipped out of the effect of the centrifugal forces, fly in rectilinear paths, thus forming in the combustion chamber 1 a cone of atomized fuel with an angle ranging from 75° to 80° at the apex if the fuel pressure in the cavity 5 of the injector 3 is 590 kPa.

Air is supplied from the annular passage 19 through the holes 16 into the combustion chamber 1.

Thus, a rich fuel-air mixture is formed in the combustion chamber 1 of the igniter. In the discharge zone 13 of the spark plug the fuel-air mixture is mixed additionally with air flowing from the cavity 26 of the bushing 21.

Under the effect of the head pressure the air through port 25 is delivered into the cavity 26. ⊖As a result of the additional mixing with air the fuel-air mixture at any portions of the discharge zone 13 of the spark plug 12 becomes suitable for ignition and is ignited by the spark discharge on the spark plug 12. Thereafter the whole fuel mixture in the combustion chamber 1 of the igniter is ignited and a torch with a plurality of active burning centers rushes along the branch 17 to the combustion chamber 18 of the engine to ignite the fresh fuel-air mixture.

It is known in varying the fuel temperature and flight altitude the angle of the fuel sprayed by the injector 3 is varied in a known range which may be easy found experimentally. It is evident that the amount of fuel supplied to the discharge zone 13 of the spark plug 12 is also varied in varying said parameters, thus producing in some cases conditions unsuitable for the operation of the igniter.

To eliminate this disadvantage the igniter is provided with the bushing 21. The use of the bushing 21 and plate 23 on the butt 22 protects the discharge zone 13 of the spark plug 12 from the fuel overflow when the fuel spray cone increases from its minimum value since the fuel overflow causes in the discharge zone 13 of the spark plug 12 a concentration of an overrich fuel-air mixture unsuitable for the ignition.

When the fuel spray cone is minimum the atomized fuel is supplied into the discharge zone 13 of the spark plug 12 either in a path parallel to the plate 23 in close vicinity thereto or slightly touching the plate 23 without influencing the efficiency of the fuel-air mixture formation and the ignition due to the slight touches but protecting the discharge zone 13 of the spark plug 12 from the overflow of fuel delivered into the discharge zone 13 of the spark plug 12 from the butt of the bushing.

When the cone of the fuel sprayed by the injector 3 increases the bushing 21 enters the body of the fuel spray and cut off by its apex a portion of the fuel spray. In the event the discharge zone 13 of the spark plug 12 is fed with the sprayed fuel passing the bushing 21 but the fuel supplied onto the bushing 21 flows therealong without penetrating into the discharge zone 13 of the spark plug 12. Thus, the discharge zone 13 of the spark plug 12 is protected from the overflow of fuel delivered to the spark plug 12 downwards and always fed with an approximately constant amount of fuel sprayed by the injector 3 into the discharge zone 13 of the spark plug 12 at all the oscillations of the angle of the fuel spray cone due to the fuel temperature and flight altitude.

The use of the recess 24 in the plate 23 to embrace the discharge zone 13 of the spark plug 12 provides for a direct contact of the electrical discharge on the spark plug 12 with the fuel-air mixture in the combustion chamber 1 of the igniter when the fuel is supplied thereto through the sprayer injector 3.

The use of the bushing 21 also contributes to a selective capacity of the igniter in the composition of fuel-air mixture since the electrical discharge of the spark plug 12 in a small volume of the cavity 26 of the bushing 21 causes the pressure pulsation therein and therefore the pulsative variation of the fuel-air mixture composition in the discharge zone 13 of the spark plug 12, thus improving the conditions of the initial ignition.

After the ignition start of the main combustion chamber of the engine the flame igniter is cut off.

Thus, the embodiment of the start flame igniter of the combustion chamber of the gas-turbine engine according to the present invention, with the reliable structure and operating according to the most simple diagram with any additional means for intensifying the combustion permits to produce the reliable and efficient ignition start of the combustion chamber of the gas-turbine engine in the range of the fuel and air temperatures from $-40°$ C to $+50°$ C and flight altitudes up to 9,000m.

What is claimed is:

1. A start flame igniter of the combustion chamber of a gas-turbine engine, comprising: a housing with a combustion chamber; an injector installed on said housing to spray fuel supplied to said combustion chamber; a spark plug located inside said housing in such a way that a discharge zone of said spark plug contacts the fuel sprayed by said injector; a hollow cylindrical bushing installed inside said housing coaxially to said spark plug and partially embracing said spark plug at the side where said discharge zone of the spark plug is situated, said bushing having the length sufficient for a direct contact with the fuel sprayed by said injector at a minimum cone of the fuel spray relative to the operation duty of the injector; a butt of said bushing, facing the sprayed fuel and having an inclination which approximately coincides with a generatrix of the minimum cone of the fuel spray; a plate on said butt of the bushing, following the shape of half of butt nearest to said injector; a recess made on said plate along its axis and embracing said discharge zone of the spark plug; a duct for supplying air to said combustion chamber, said duct installed on said housing; a branch for connecting said combustion chamber with the combustion chamber of the engine, said branch arranged on said housing.

2. A start flame igniter as claimed in claim 1, wherein said cylindrical bushing has a port for supplying air to a cavity of said bushing, said port situated at the side where said duct for supplying air to said combustion chamber of the igniter is located.

* * * * *